Figure 1:
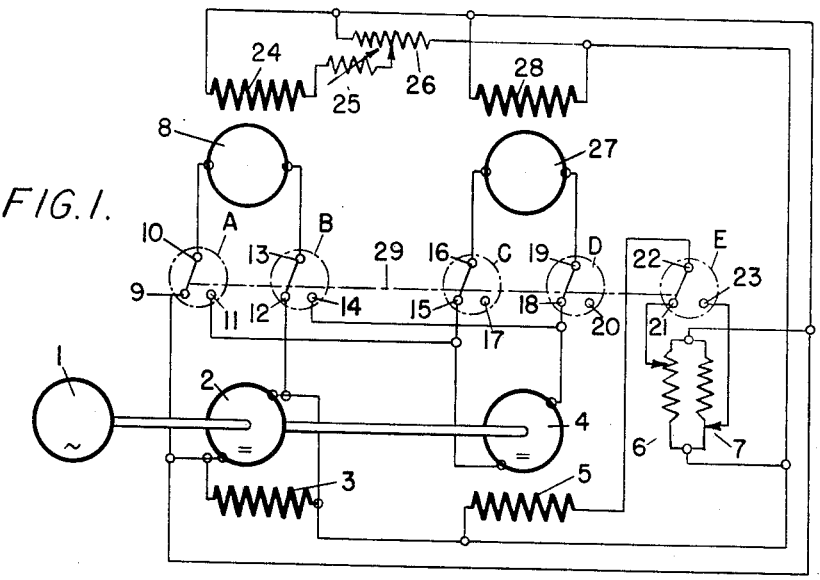

Jan. 29, 1957  G. KOPPENWALLNER ET AL  2,779,905
SPEED CONTROL MEANS FOR GRINDING MACHINES OR THE LIKE
Filed Oct. 30, 1953

*INVENTORS*
GEORG KOPPENWALLNER
ANTON GANTERT
BY
Robert H. Jacob
*AGENT*

United States Patent Office 2,779,905
Patented Jan. 29, 1957

2,779,905

SPEED CONTROL MEANS FOR GRINDING MACHINES OR THE LIKE

Georg Koppenwallner, Stuttgart-Bad Cannstatt, and Anton Gantert, Eislingen (Fils), Germany, assignors to Fortuna-Werke Spezialmaschinenfabrik A.-G., Stuttgart-Bad Cannstatt, Germany Application October 30, 1953, Serial No. 389,341

Claims priority, application Germany November 8, 1952

8 Claims. (Cl. 318—149)

The invention relates to a circuit for controlling the number of revolutions per minute of the driving motors of grinding machines, particularly of the grinding disk motor and of the work rotating motor when direct current is used.

In connection with normal grinding work the grinding disk motor is known to have a relatively large number of revolutions per minute coupled with high output, while the work rotating motor has a relatively low number of revolutions with low output. Both motors should be continuously adjustable within their ranges of speed. The ratio of lowest number of revolutions per minute to highest number of revolutions per minute as expressed by the formula $$R = \frac{n \min}{n \max}$$

being, for example, 1:4 for the grinding wheel motor and 1:10 for the work rotating motor.

The adjustment of the number of rotations per minute for a ratio 1:4 can be readily obtained by a circuit connection as a shunt motor where the armature is connected to the total D. C. voltage, while the field voltage is regulated.

In order to control the number of revolutions per minute for a ratio 1:10, the well known Ward-Leonard circuit can be used, where the field voltage remains constant, while the armature is connected to the secondary voltage of an amplifier, for example a control generator which is variable in accordance with the desired number of revolutions per minute, in which system the output of the amplifier corresponds to the output of the motor.

The requirement arises however, that the grinding disk motor in addition to its control range for the number of revolutions per minute $R=1:4$ should also operate for dressing or crushing operations at numbers of revolutions which are substantially smaller, i. e. the ratio should be $R=1:20$ or still less. In order to achieve these low numbers of revolution it was customary heretofore to insert a mechanical step down, gear or belt drive or a second motor having a lower number of revolutions per minute which was idling during grinding while during the wheel crushing the main driving motor was idling, or a second amplifier was inserted in the grinding machine to supply a controlled potential to the armature after switching over. At any rate, a considerable additional expenditure of material, space, etc., was required.

The term dressing as used herein defines the operations performed on the grinding wheel in order to restore its cutting efficiency. Dressing serves to remove the metal and dirt particles which closely adhere to the wheel after a period of use, thus cleaning the cutting surface and the grains for best performance. The term dressing is also used with reference to truing, which are the operations by which the face of the wheel is made parallel to the wheel axis and the wheel face is formed to the desired contour. Truing is frequently done by means of hardened steel rollers or crushers which have the particular surface contour which is to be imparted to the wheel surface. This operation is termed crush truing or simply crushing.

In accordance with the invention this double expenditure in the form of an additional transmission or a second motor or amplifier is to be avoided. The subject of the invention is a circuit arrangement in accordance with which the armature of the grinding disk motor is connected to the adjustable output potential of the available relatively weak amplifier for the low numbers of revolutions per minutes of the grinding disk motor during wheel dressing or crushing, while the work rotating motor may be disconnected, if desired. The amplifier per se is only arranged for the low output of the work rotating motor which is only a fraction of the normal output of the grinding disk motor. While crushing at a low number of revolutions per minute the output of the grinding disk motor is so small that the amplifier is fully sufficient to provide this output. The necessary control of the amplifier potential corresponding to the low number of revolutions per minute for crushing is effected by inserting a second potentiometer which is connected in parallel to the first potentiometer required for the control of the armature potential of the work rotating motor. In switching from the operating condition "grinding" to the condition "crushing" the switch components by means of which the armature of the grinding disk motor is disconnected from the constant potential and connected to the variable potential of the amplifier are simultaneously operated by means of a single switch arm while also the switch component is operated for shifting from the contact of the first to the contact of the second potentiometer. The position of these contacts required for predetermined numbers of revolutions per minute of the work piece during grinding, or for the grinding disk during crushing, is, accordingly, not affected by the shifting or switching.

The numbers of revolutions per minute desired at any particular time during grinding or also during crushing may, therefore, be set up in advance with the corresponding potentials on the potentiometers. The additional or the subsequent installation of a potentiometer which requires little space, or the reconnecting of the leads are extremely simple measures for improving the efficiency of the machine and are possible without difficulty.

Thus, with the machine equipped in accordance with the invention it is possible with merely a second potentiometer, a coupling of the switches and corresponding circuit arrangement to set up all desired numbers of revolutions per minute without additional mechanical auxiliary means, further motors or generators. The particular advantage of this circuit arrangement resides in meeting the requirement for a low number of revolutions per minute of the grinding disk motor for crushing with the control elements available in a normal grinding machine while saving the installation of a further control generator or another control unit (transmission or the like). This is particularly advantageous if it is important to equip an available machine with a means for crushing. Usually no space is available for accommodating a further control unit in the base of the machine. However, in accordance with the invention it is sufficient to provide a further potentiometer which does not require much space and the coupled switch.

Fig. 1 of the drawing shows a circuit arrangement in connection with which it is assumed that no D. C. line but an A. C. line is available. A D. C. generator for constant potential and a Leonard control generator are driven by a three phase A. C. motor.

Figure 2:
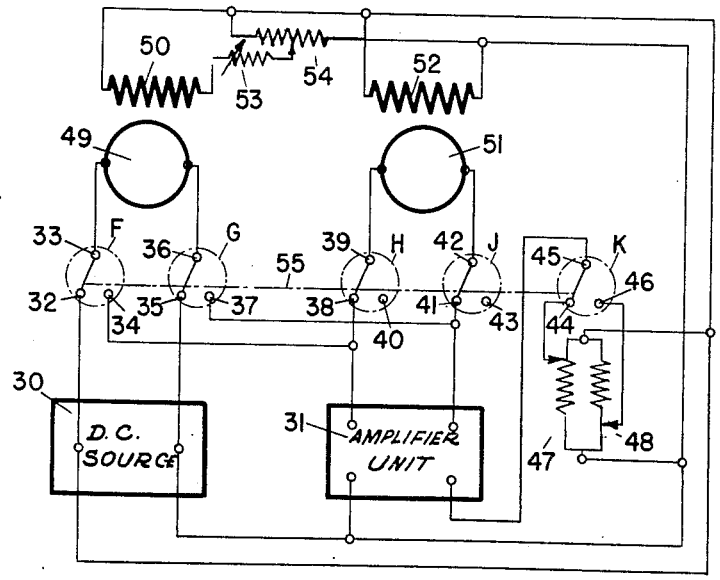

Fig. 2 assumes a D. C. source, for example, a D. C. line or any converter known per se, to which is added an amplifier of any suitable construction, for example a Ward-Leonard control assembly, Amplydine-assembly, tube amplifier, magnetic amplifier.

The main driving motor 1 drives a D. C. generator 2 which is self excited by its field 3, and drives also the Leonard control generator 4, the field 5 of which is externally excited during grinding operations by way of contacts 21, 22 with the control potential produced by D. C. generator 2 but controlled by potentiometer 6. As a result the output potential of the control generator 4 is also adjustable. The armature of the work rotating motor 27 is supplied by way of contacts 15, 16 and 18, 19 with this controlled output potential of the control generator 4 while its field 28 is supplied with the full potential of the D. C. generator 2. The armature of the grinding stone motor 8 is supplied with the full potential of the D. C. generator through contacts 9, 10 and 12, 13, while its field is supplied only with a portion of the potential of the D. C. generator adjusted to correspond to the number of revolutions per minute desired for grinding. This circuit arrangement is satisfactory for normal grinding operations.

For crushing at a low number of revolutions per minute of the grinding disk motor a coupling 29 is employed which connects and simultaneously operates the five switching elements A, B, C, D, E to shift in a manner to connect the armature of the grinding disk motor by way of contacts 11, 10 and 14, 13 to the controlled secondary potential of the control generator the field of which is now externally excited by way of contacts 23, 22 and potentiometer 7. The work rotating motor may be shut off during this operation as long as contacts 15 and 17, 18 and 20 are not short circuited. The adjusted position of potentiometer 7 is such that the output potential to which control generator 4 is adjusted permits only the desired low number of revolutions per minute of the grinding disk motor 8 while the work rotating motor 27 (51 in Fig. 2) is standing still.

Assuming that there is a D. C. source 30 and an amplifier unit 31 of any desired construction as illustrated in Fig. 2 the armature 49 of the grinding disk motor is supplied with the full potential from the D. C. source 30 through contacts 32, 33 and 35, 36, while its field is only supplied with a controlled portion of this potential by means of potentiometer 53, 54, corresponding to the desired number of revolutions per minute. The armature 51 of the grinding disk motor is supplied with the controlled secondary potential of the amplifier 31 through contacts 38, 39 and 41, 42 while its field receives the total potential of the D. C. source 30. The secondary potential of the amplifier is controlled by the control potential which is picked up at contacts 44, 45 of the potentiometer 47; the potentiometer 47 is connected to the potential of the D. C. source 30.

In order to shift to the position for crushing a coupling 55 is used which connects and simultaneously operates the five switch members F, G, H, J, K. This places armature 49 of the grinding disk motor across the controlled secondary potential of amplifier 31 by way of contacts 34, 33 and 37, 36, while the control potential (primary) for the amplifier 31 is set to a suitable value to the number of revolutions per minute for crushing by means of potentiometer 48 through contacts 46, 45. As long as contacts 38 and 40, 41 and 43 are not short circuited the work rotating motor can be shut off during this operation.

Having thus fully described our invention and its method of operation, what we claim is:

1. Means for controlling the speed of two motors of grinding machines or the like, particularly of a grinding wheel motor having normally a relatively high speed and a high output and of a work rotating motor having normally a relatively low speed and a small output, said means including a plurality of interconnected switches, a source of direct current potential and an amplifying means adjustable to a high and to a low output potential for meeting the output requirements of the work rotating motor when connected thereto and of the grinding wheel motor when connected thereto, whereby for normal grinding operations the armature of the grinding wheel motor is connected in a normal manner to the full potential of the direct current source while the field of the grinding wheel motor is supplied by way of potential control means with a portion of said full potential and whereby the armature of the work rotating motor is connected to a predetermined output potential of the amplifying means and the field thereof is connected to the said full potential, and whereby for extremely low speeds of the grinding wheel motor, for example, for wheel dressing or crushing operations the armature of the grinding wheel motor is connected to the low output potential of the amplifying means while the work rotating motor may be shut off.

2. Means as set forth in claim 1 including rheostats or the like whereby the adjustable potentials of the amplifier for the different operating conditions of the two motors are adjusted in advance and separately for each motor.

3. Control means as claimed in claim 2 including a single switch lever or the like mechanically connecting said interconnected switches in a manner to provide for simultaneous execution of the shifting operations from grinding to crushing operations and vice versa.

4. Means for controlling the speed of two motors of grinding machines or the like, particularly of a grinding wheel motor having normally a relatively high speed and a high output and of a work rotating motor having normally a relatively low speed and a small output, said means including a plurality of interconnected switches, a source of direct current potential and an amplifying means adjustable to a high and to a low output potential for meeting the output requirements of the work rotating motor when connected thereto and of the grinding wheel motor when connected thereto, whereby for normal grinding operations the armature of the grinding wheel motor is connected in a normal manner to the full potential of the direct current source while the field of the grinding wheel motor is supplied by way of potential control means with a portion of said full potential and whereby the armature of the work rotating motor is connected to a predetermined output potential of the amplifying means and the field thereof is connected to the said full potential, and whereby for extremely low speeds of the grinding wheel motor, for example, for wheel dressing or crushing operations the armature of the grinding wheel motor is connected to the low output potential of the amplifying means while the work rotating motor may be shut off, said grinding wheel motor having a field connected to a predetermined potential derived from said direct current source and an armature associated with contacts adapted in one position of said switches to connect said armature to said source of direct current potential and in another position to connect said armature to a potential derived from the output of said amplifier.

5. A system for effecting grinding operations including components which can be adapted for effecting dressing and truing of the grinding wheel, said system including a grinding wheel motor, a work rotating motor, a first source of direct current potential connected to the armature of the grinding wheel motor, a second source of direct current potential normally connected to the armature of the work rotating motor provided with selective high and low potential adjusting means, and a general source of direct current potential derived from said first source and applied to the fields of said grinding wheel motor, of said work rotating motor and to said potential adjusting means of said second source of direct current potential; said system including switching means connected to said first and second sources of potential and to said potential adjusting means and adapted simultaneously to shift said second source of direct current potential from said work rotating motor to said grinding wheel motor, to set said potential adjusting means of said second source to provide for a lower potential output, and to disconnect said grinding wheel motor from said first source of direct current potential.

6. A system for effecting grinding operations including components which can be adapted for effecting dressing and truing of the grinding wheel, said system including a grinding wheel motor, a work rotating motor, a first source of direct current potential connected to the armature of the grinding wheel motor, a second source of direct current potential normally connected to the armature of the work rotating motor and provided with selective high and low potential adjusting means, and a general source of direct current potential derived from said first source and applied to the fields of said grinding wheel motor, of said work rotating motor and to said potential adjusting means of said second source of direct current potential; said system including switching means connected to said first and second sources of potential and to said potential adjusting means and adapted simultaneously to shift said second source of direct current potential from said work rotating motor to said grinding wheel motor, to set said potential adjusting means of said second source to provide for a lower potential output, and to disconnect said grinding wheel motor from said first source of direct current potential, and said potential adjusting means including a pair of potentiometers connected in parallel across the supply line of said general source of direct current potential and having each a movable contact, each connected to a terminal of a different position on said switching means.

7. In a system for effecting grinding operations including a grinding wheel motor, a work rotating motor, first and second sources of direct current potential normally applied to the armatures of said grinding wheel motor and of said work rotating motor, respectively, and selective high and low potential controls operative to change the output potential of said second source and supplied with current from said first source, the means for controlling the operation of said motors comprising switch gear having one operative position including terminals connecting the armature of said grinding wheel motor to said first source of potential, the armature of said work rotating motor to said second source of potential and said selective high potential control into the circuit of said second source of potential, and having another operative position including terminals connecting said second source of potential to the armature of said grinding wheel motor and said selective low potential control into the circuit of said second source of potential, while the armature of said work rotating motor is disconnected from said second source.

8. In a system for effecting grinding operations including a grinding wheel motor, a work rotating motor, first and second sources of direct current potential normally applied to the armatures of said grinding wheel motor and of said work rotating motor, respectively, and selective high and low potential controls operative to change the output potential of said second source and supplied with current from said first source, the means for controlling the operation of said motors comprising switch gear having one operative position including terminals connecting the armature of said grinding wheel motor to said first source of potential, the armature of said work rotating motor to said second source of potential and said selective high potential control into the circuit of said second source of potential, and having another operative position including terminals connecting said second source of potential to the armature of said grinding wheel motor and said selective low potential control into the circuit of said second source of potential, while the armature of said work rotating motor is disconnected from said second source, said first and second sources of potential being generators, said selective high and low potential controls being potentiometers connected in series with the field of the generator of said second source of potential and the fields of said motors and of the generator of said second source of potential being connected for current supply to said first source of potential.

References Cited in the file of this patent

UNITED STATES PATENTS 1,743,246    Staege ------------------ Jan. 14, 1930